United States Patent
Glück et al.

(10) Patent No.: US 11,345,345 B2
(45) Date of Patent: May 31, 2022

(54) METHOD FOR OPERATING A MOTOR VEHICLE, AND CORRESPONDING MOTOR VEHICLE

(71) Applicant: AUDI AG, Ingolstadt (DE)

(72) Inventors: Christian Glück, Eichstätt (DE);
Michael Schmidhuber, Vohburg (DE);
Sebastian Falk, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 262 days.

(21) Appl. No.: 16/190,623

(22) Filed: Nov. 14, 2018

(65) Prior Publication Data
US 2019/0168756 A1 Jun. 6, 2019

(30) Foreign Application Priority Data
Dec. 3, 2017 (DE) .................... 10 2017 221 740.5

(51) Int. Cl.
*B60W 30/16* (2020.01)

(52) U.S. Cl.
CPC .......... *B60W 30/162* (2013.01); *B60W 30/16* (2013.01); *B60W 2520/10* (2013.01);
(Continued)

(58) Field of Classification Search
CPC .............................. B60W 30/162; B60W 30/16
See application file for complete search history.

(56) References Cited

U.S. PATENT DOCUMENTS

| 7,054,733 B2 * | 5/2006 | Kubota ............. B60K 31/0008 180/179 |
| 2002/0026274 A1 * | 2/2002 | Morizane ........... B60K 31/0008 701/93 |

(Continued)

FOREIGN PATENT DOCUMENTS

| CN | 101998913 A | 3/2011 |
| CN | 103419785 A | 12/2013 |

(Continued)

OTHER PUBLICATIONS

The extended European search report dated Apr. 9, 2019 in corresponding European patent application No. 18207175.3 including partial machine-generated English language translation; 13 pages.

(Continued)

*Primary Examiner* — Todd Melton
*Assistant Examiner* — Jason R Roberson
(74) *Attorney, Agent, or Firm* — Maier & Maier, PLLC

(57) ABSTRACT

A method for operating a motor vehicle, with a drive device for providing a driving torque as well as a detection device for detecting at least one other motor vehicle up ahead. An automatic length guidance of the motor vehicle is carried out. In this case, it is provided that, in the framework of the length guidance, a distance of the motor vehicle from the other motor vehicle is adjusted to a nominal distance. The nominal distance corresponds to a distance setting at constant distance, and starting from the distance setting, it is increased in the event of a distance change resulting from a positive acceleration of the other motor vehicle, and it is reduced in the event of a distance change resulting from a negative acceleration of the other motor vehicle.

14 Claims, 2 Drawing Sheets

(52) U.S. Cl.
CPC ..... *B60W 2552/00* (2020.02); *B60W 2552/40* (2020.02); *B60W 2554/801* (2020.02); *B60W 2554/804* (2020.02); *B60W 2555/00* (2020.02); *B60W 2555/20* (2020.02); *B60W 2555/60* (2020.02); *B60W 2710/0666* (2013.01); *B60W 2710/083* (2013.01); *B60W 2720/106* (2013.01); *B60W 2754/30* (2020.02)

(56) References Cited

U.S. PATENT DOCUMENTS

| | | | |
|---|---|---|---|
| 2004/0102889 A1* | 5/2004 | Ibrahim | B60W 30/16 701/96 |
| 2005/0251313 A1* | 11/2005 | Heinrichs-Bartscher | B60W 30/16 701/41 |
| 2006/0100769 A1* | 5/2006 | Arai | B60W 30/16 701/96 |
| 2007/0254776 A1 | 11/2007 | Wakashiro et al. | |
| 2008/0162011 A1* | 7/2008 | Pfeiffer | B60W 30/16 701/96 |
| 2009/0037071 A1* | 2/2009 | Inoue | B60W 50/14 701/96 |
| 2009/0228185 A1* | 9/2009 | Laiou | B60W 30/16 701/96 |
| 2010/0256852 A1* | 10/2010 | Mudalige | G08G 1/22 701/24 |
| 2011/0196591 A1* | 8/2011 | Kuze | B60W 30/16 701/96 |
| 2011/0224844 A1* | 9/2011 | Farwell | G05D 1/0295 701/2 |
| 2015/0006056 A1* | 1/2015 | Fairgrieve | B60W 30/16 701/96 |
| 2015/0081189 A1* | 3/2015 | Fairgrieve | B60W 30/16 701/96 |
| 2016/0101780 A1 | 4/2016 | Park | |
| 2017/0080939 A1* | 3/2017 | Raghu | B60W 40/04 |
| 2017/0349157 A1* | 12/2017 | Hokoi | B60K 6/383 |
| 2018/0001764 A1* | 1/2018 | Bang | B60W 30/16 |
| 2018/0126931 A1* | 5/2018 | Deragården | G05D 1/0293 |
| 2019/0391259 A1* | 12/2019 | Shimizu | G01S 13/931 |

FOREIGN PATENT DOCUMENTS

| | | |
|---|---|---|
| CN | 104859653 A | 8/2015 |
| CN | 107257757 A | 10/2017 |
| DE | 44 37 678 A1 | 5/1996 |
| DE | 10 2011 121 853 A1 | 6/2012 |
| DE | 102014207068 A1 | 10/2015 |
| DE | 10 2014 214 140 A1 | 1/2016 |
| WO | 2012/072464 A1 | 6/2012 |

OTHER PUBLICATIONS

Chinese Office Action dated Aug. 13, 2021, in connection with corresponding CN Application No. 201811434544.3 (15 pp., including machine-generated English translation).

Examination Report dated Aug. 13, 2018 of corresponding German application No. 10 2017 221 740.5; 10 pp., including machine-generated English translation.

* cited by examiner

METHOD FOR OPERATING A MOTOR VEHICLE, AND CORRESPONDING MOTOR VEHICLE

FIELD

The invention relates to a method for operating a motor vehicle, comprising a drive device for providing a driving torque as well as a detection device for detecting at least one other motor vehicle up ahead, wherein an automatic length guidance of the motor vehicle is carried out. The invention furthermore relates to a motor vehicle.

BACKGROUND

From the prior art there is known, for example, the publication WO 2012/072464 A1. This publication relates to a method for operating a vehicle in which energy is recuperated in thrust and/or braking phases of the vehicle and stored in an internal energy storage system of the vehicle, wherein the surroundings of the vehicle are detected by means of a detector device and at least one object characteristic is evaluated depending on the detecting of an object in the surroundings of the vehicle, and, depending on the evaluation of the object characteristic, the thrust and/or braking phase(s) is/are automatically adapted to at least one parameter characterizing the energy storage system.

SUMMARY

It is the object of the invention to propose a method for operating a motor vehicle, this method having advantages over known methods, in particular, one that makes possible an especially efficient and/or comfortable operation of the motor vehicle.

According to the invention, this is accomplished with a method for operating a motor vehicle. It is proposed that, in the framework of the length guidance, a distance of the motor vehicle from the other motor vehicle is adjusted to a nominal distance, wherein the nominal distance corresponds to a distance setting at constant distance, and, starting from the distance setting, it is increased in the event of a distance change resulting from a positive acceleration of the other motor vehicle, and it is reduced in the event of a distance change resulting from a negative acceleration of the other motor vehicle.

The motor vehicle provides the drive device that serves for the propelling of the motor vehicle, and thus, in this regard, for supplying the driving torque designed to propel the motor vehicle. Furthermore, the motor vehicle provides the detection device, such as a surroundings sensing device, which serves at least for detecting the at least one other motor vehicle—if any—up ahead. This means that the detection device can recognize whether the other motor vehicle is present. If this is the case, then the other motor vehicle will be detected or monitored.

The automatic length guidance of the motor vehicle is carried out with the aid of the detection device, wherein a speed of the motor vehicle is preferably made equal to the speed of the other motor vehicle up ahead, in such a way that the distance present between the motor vehicle and the other motor vehicle remains constant at least for some of the time. In the framework of the length guidance, the drive device is accordingly adjusted to provide a particular driving torque so that a speed and/or an acceleration of the motor vehicle as predetermined in the framework of the length guidance is set.

It is now provided that the distance between the motor vehicle and the other motor vehicle is regulated to the nominal distance in the framework of the length guidance. The nominal distance corresponds to a particular distance between the two motor vehicles, i.e., the motor vehicle and the other motor vehicle, and it should be kept constant at least for some of the time. This is the case, in particular, if the other motor vehicle is moving at constant speed. At constant speed of both motor vehicles, a constant distance is therefore present. In this case, the nominal distance is set to the distance setting and the distance regulation is then carried out. Ultimately, there is present between the motor vehicles a distance corresponding to the distance setting, namely, in the event that both of them are moving at constant speed and the speed of the motor vehicle corresponds to the speed of the other motor vehicle.

If the other motor vehicle is moving faster or slower, the distance between the motor vehicles will be changed, at least until the distance regulation has once more set the distance between the motor vehicles to the nominal distance or the distance setting. If the speed of the other motor vehicle increases, i.e., if a positive acceleration is present, the distance between the motor vehicles will at first become greater. On the other hand, upon reduction in the speed of the other motor vehicle and thus a negative acceleration, the distance will become less.

The goal of the method according to the invention is to configure the driving operation of the motor vehicle, on the one hand, as energy efficiently as possible, and, on the other hand to make it as comfortable as possible to an occupant of the motor vehicle. For this reason, it is not provided to bring about immediately a corresponding acceleration of the motor vehicle in the event of the positive acceleration or the negative acceleration of the other motor vehicle, namely, by demanding a corresponding driving torque from the drive device.

Instead, in the event of the positive acceleration, the distance between the motor vehicles is allowed to increase, and in the event of the negative acceleration, the distance between the motor vehicles is allowed to decrease. For this, the nominal distance is increased, starting from the distance setting, when the positive acceleration is present, and it is decreased, if the negative acceleration is present. Accordingly, the acceleration of the motor vehicle is at least temporarily less than the acceleration of the other motor vehicle, so that the acceleration is perceived as pleasant by the occupant of the motor vehicle.

The procedure is especially advantageous if the motor vehicle is a hybrid operated motor vehicle, having a first drive assembly and a second drive assembly. The rated torque of the second drive assembly is less than the rated torque of the first drive assembly in this case. For example, an internal combustion engine is used as the first drive assembly and an electrical machine as the second drive assembly, wherein the electrical machine can also be called a traction machine.

By allowing the distance between the motor vehicles to increase, the driving torque can be chosen in such a way that it may be provided solely by means of the second drive assembly. This prevents a starting of the first drive assembly, namely, the internal combustion engine for example, in the event of a positive acceleration of the motor vehicle. In the case of a negative acceleration, the use of the service brake of the motor vehicle is prevented for as long as is possible. Accordingly, an energy-efficient deceleration of the motor vehicle can be conducted with the aid of the second drive assembly with recuperation of electrical energy.

It may also be provided, for example, that a deceleration of the motor vehicle, i.e., a negative acceleration, is accomplished solely by rolling torques and/or frictional torques, so that the drive device is not used. Accordingly, neither the first drive assembly nor the second drive assembly will be used to slow down the motor vehicle, as long as the rolling torque and/or the frictional torque of a drive train of the motor vehicle, for example, is enough to slow down the motor vehicle to a sufficient degree, namely, especially so as to avoid a collision with the other motor vehicle.

It should be pointed out explicitly that the distance regulation will be carried out, namely, the distance between the motor vehicles will be adjusted to the nominal distance, depending on the choice of the nominal distance, i.e., depending on whether the nominal distance corresponds to the distance setting or is smaller or larger than it. Thus, the distance regulation will not even be interrupted upon acceleration of the other motor vehicle, but instead it will be carried out continually.

In other words, it is provided that a distance of the motor vehicle from the other motor vehicle is adjusted to a nominal distance in the framework of the length guidance, wherein the nominal distance corresponds to a distance setting at constant speed of the other motor vehicle, and starting from the distance setting, it is increased in the event of an increasing speed resulting from a positive acceleration of the other motor vehicle, and it is reduced in the event of a decreasing speed resulting from a negative acceleration of the other motor vehicle.

In the context of another embodiment of the invention, it is proposed that the nominal distance is bounded at the bottom by a minimum distance and at the top by a maximum distance, which together span a distance setting range. The distance setting range is accordingly defined by the minimum distance and the maximum distance, being bounded at the bottom by a minimum distance and at the top by a maximum distance. The minimum distance corresponds to the minimum allowable distance between the motor vehicles, while the maximum distance represents the maximum allowable distance between the motor vehicles.

By appropriate choice of the distance setting range, an accident can thus be reliably prevented between the motor vehicles, but, on the other hand, too great a distance between the motor vehicles can also be prevented. More preferably, it is proposed when determining the distance setting range to determine the minimum distance in dependence on at least the speed of the motor vehicle. Thus, the minimum distance is not constant, but rather it is calculated from the speed of the motor vehicle, namely, in such a way that a sufficient distance is always present between the motor vehicles, making possible a reliable stopping of the motor vehicle from the speed that is instantaneously present.

In addition, a coefficient of friction between a tire of the motor vehicle and a roadway can furthermore go into the calculation of the minimum distance. In addition or alternatively, at least one of the following values can also be used: the speed of the other motor vehicle, the acceleration of the other motor vehicle, and at least one surrounding condition, such as a precipitation condition and/or an outdoor temperature.

Preferably, a user of the motor vehicle has no influence on the minimum distance. Thus, the latter is either set constant or it is set variable according to the preceding statements. Alternatively, it may be provided that the user of the motor vehicle can only increase, but not decrease, the minimum distance starting from the value set as a function of at least the speed of the motor vehicle.

In contrast with this, however, it may be provided that the user of the motor vehicle can adjust the maximum distance at will, the maximum distance being bounded at the bottom by the minimum distance, i.e., it cannot become less than this. Preferably, the maximum distance is always greater than the minimum distance.

In the context of another preferred embodiment of the invention, it may be provided that an acceleration setting is determined as a function of the acceleration of the other motor vehicle and set at the drive device, wherein the acceleration setting is oriented to a speed change in the motor vehicle and has the same sign as the acceleration of the other motor vehicle. The acceleration setting is implemented with the aid of the drive device, namely, by setting a corresponding nominal torque at the drive device. The drive device is then actuated to produce an actual torque corresponding to the nominal torque in the form of the driving torque, in order to accelerate the motor vehicle.

In addition or alternatively, the service brake of the motor vehicle may also be actuated accordingly, namely, if the negative acceleration of the other motor vehicle is present. In any case, however, the acceleration setting is oriented to the speed change of the motor vehicle, i.e., it is different from zero. However, it has the same sign as the acceleration of the other motor vehicle. Thus, if the acceleration of the other motor vehicle is positive, so too should the acceleration setting be positive.

In the case of negative acceleration of the other motor vehicle, the acceleration setting is also negative. At least for some of the time, however, the acceleration setting is less than the acceleration of the other motor vehicle, in order to increase the distance between the motor vehicles, in the event of positive acceleration of the other motor vehicle, and to decrease it in the event of negative acceleration of the other motor vehicle. The advantages already mentioned can be accomplished with such a choice of the acceleration setting.

Another embodiment of the invention provides that a final speed of the other motor vehicle at the end of an acceleration is predicted on the basis of at least one surrounding condition. Both in the event of the positive acceleration and the negative acceleration, it should accordingly be estimated how high the final speed of the other motor vehicle will be at the end of the acceleration. The speed of the other motor vehicle changes during the acceleration and remains constant as of the end of the acceleration, at least for a short period of time, or preferably permanently.

The final speed can be estimated on the basis of the surrounding condition, at least in the event of the positive acceleration. By the surrounding condition is meant, for example, a condition of the roadway, a maximum speed setting, a traffic density, or the like. Thus, in the case of high traffic density, the final speed will be lower than in the case of a low traffic density.

At least one of the mentioned surrounding conditions can also be used in the case of the negative acceleration to predict the final speed. However, it may also be provided that the final speed is set at zero in one simple embodiment, so that it is always assumed that the negative acceleration is oriented to a stopping of the other motor vehicle, or accomplishes said stopping. By estimating the final speed of the other motor vehicle, an especially safe and energy-efficient length guidance of the motor vehicle can be accomplished.

An enhancement of the invention provides that the predicted distance of the motor vehicle from the other motor vehicle at the end of the acceleration is determined on the basis of at least the acceleration of the motor vehicle and the acceleration of the other motor vehicle. This determination is made preferably continually in the framework of the length guidance, if the acceleration of the other motor vehicle is present, i.e., its speed is changing. The predicted distance between the motor vehicles at the end of the acceleration can be calculated from the accelerations of the two motor vehicles as well as the time span between the time of calculating the anticipated distance and the end of the acceleration.

For example, it is assumed that the acceleration of the motor vehicle and the acceleration of the other motor vehicle remain constant up to the end of the acceleration. The end of the acceleration or the time until the end of the acceleration is preferably calculated by an extrapolation of the speed of the motor vehicle up to the final speed by using the instantaneous acceleration of the other motor vehicle.

In addition, the acceleration gradient of the motor vehicle and/or the acceleration gradient of the other motor vehicle may also be used for the calculation. By the acceleration gradient is meant the change in the respective acceleration over time. The determining of the anticipated distance between the motor vehicles at the end of the acceleration makes possible a reliable length guidance of the motor vehicle.

Another especially preferred embodiment of the invention provides that the nominal torque set at the drive device is chosen in such a way that the predicted distance lies in the distance setting range. After determining the anticipated distance at the end of the acceleration, the distance is thus compared to the distance setting range or the minimum distance and the maximum distance. Preferably, under the assumption that the acceleration of the other motor vehicle remains constant until the end of the acceleration, the nominal torque is now chosen in such a way that the predicted distance present at the end of the acceleration lies in the distance setting range, so that, on the one hand, a collision of the motor vehicles, and, on the other hand, an undesirable distinct increasing of the distance is prevented.

For example, the nominal torque is selected in the framework of a regulating of the nominal torque as a function of the predicted distance. The nominal torque serves here as a control variable, while a controlled variable is determined from the predicted distance. For example, the controlled variable is obtained from the difference between the predicted distance and the minimum distance or the maximum distance, depending on which value is closer.

For example, the nominal torque is held constant for as long as the predicted distance lies in the distance setting range. But if the predicted distance leaves the distance setting range, above or below it, the nominal torque will be changed and adjusted at the drive device so that the predicted distance is changed toward the distance setting range, especially to fall into that range. With such a procedure, a safe driving operation of the motor vehicle is assured.

Another especially preferred embodiment of the invention provides that the nominal torque is chosen in such a way that the predicted distance at the end of the acceleration—in the case of negative acceleration—corresponds to the minimum distance or—in the case of positive acceleration—to the maximum distance. Thus, it is not only provided to maintain the predicted distance within the distance setting range, but also it should be explicitly adjusted to one of the limits of the distance setting range, i.e., either the minimum distance or the maximum distance.

If the other motor vehicle slows down, the predicted distance at the end of the acceleration should correspond to the minimum distance. On the other hand, if the other motor vehicle speeds up, the maximum distance should be used as a reference variable for the predicted distance. This enables an energy-efficient driving operation of the motor vehicle, especially in the case of negative acceleration.

Another embodiment of the invention provides that, starting from the end of the acceleration, the speed of the motor vehicle is set by maintaining the nominal torque such that the distance between the motor vehicle and the other motor vehicle is changed in the direction of the distance setting. At the end of the acceleration, even though the distance between the motor vehicles lies in the distance setting range, usually it no longer corresponds to the distance setting. The distance setting preferably lies in the distance setting range, i.e., on the one hand, it is greater than the minimum distance and, on the other hand, it is less than the maximum distance. More preferably, the distance setting lies in the middle between the minimum distance and the maximum distance, i.e., it has the same distance from both of these limits.

The distance setting is the usually desired distance between the motor vehicles that is adjusted in the process of the length guidance. Therefore, once the advantages of the method described in the scope of this description have been accomplished by decreasing or increasing the distance, the distance between the motor vehicles is once more adjusted to the distance setting or to the nominal distance corresponding to the distance setting. Therefore, the user of the motor vehicle does not have to get used to this. Even so, the described advantages can be accomplished by the preceding decreasing or increasing of the distance.

In the context of another especially preferred embodiment of the invention, it may be provided that the distance of the motor vehicle from the other motor vehicle is adjusted to the nominal distance when the speed of the other motor vehicle remains constant as of the end of the acceleration. The adjusting of the distance between the motor vehicles to the nominal distance should thus be performed not only before the presence of the positive acceleration or the negative acceleration, but also after the end of the acceleration, more precisely, starting from the end of the acceleration. Once the speed of the other motor vehicle is found to be constant, the nominal distance will preferably be adjusted to the distance setting and then the distance will be adjusted to this.

The invention furthermore relates to a motor vehicle, especially one for carrying out the method according to the statements in the context of this description, the motor vehicle comprising a drive device for providing a driving torque as well as a detection device for detecting at least one other motor vehicle up ahead, and wherein an automatic length guidance of the motor vehicle is present. In this case, it is provided that the motor vehicle is designed to adjust a distance of the motor vehicle from the other motor vehicle to a nominal distance in the framework of the length guidance, wherein the nominal distance corresponds to a distance setting at constant distance, and, starting from the distance setting, it is increased in the event of a distance change resulting from a positive acceleration of the other motor vehicle, and it is reduced in the event of a distance change resulting from a negative acceleration of the other motor vehicle.

The advantages of such a procedure or such a configuration of the motor vehicle have already been pointed out. Both the motor vehicle and the method for its operation can be enhanced in accordance with the statement in the context of this description, so that reference is made to them in this regard.

BRIEF DESCRIPTION OF THE DRAWINGS

The invention shall now be explained more closely on the basis of exemplary embodiments represented in the drawing, without this limiting the invention. Shown herein are.

DETAILED DESCRIPTION

Figure 1:
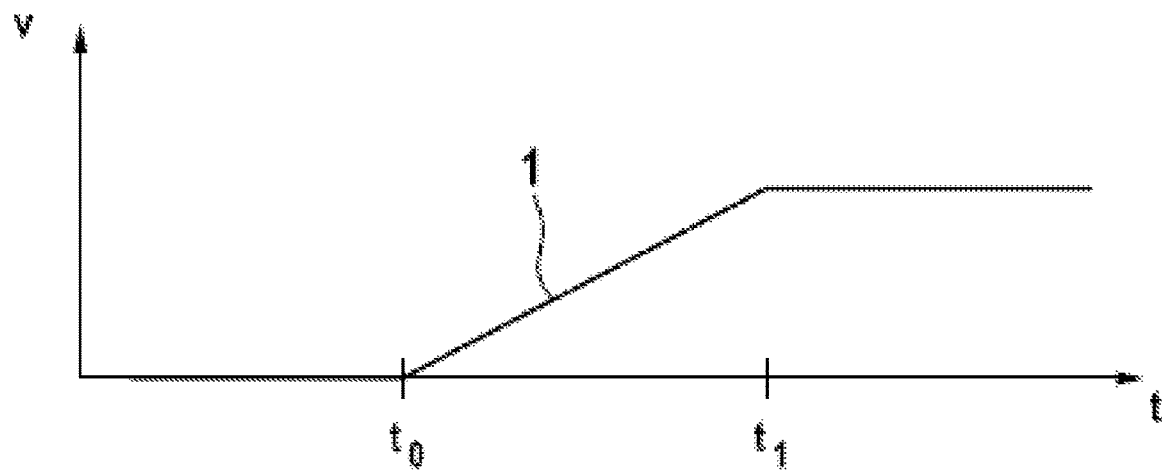
FIG. 1 a diagram in which the speed of a motor vehicle up ahead is plotted against time for a positive acceleration.

FIG. 1 shows a diagram in which a curve 1 of the speed v of a motor vehicle up ahead is plotted against time t. It becomes clear that the speed as of the time $t_0$ increases with constant positive acceleration. As of time $t_1$ the acceleration is equal to zero, so that afterwards the speed of the motor vehicle up ahead remains constant.

Figure 2:
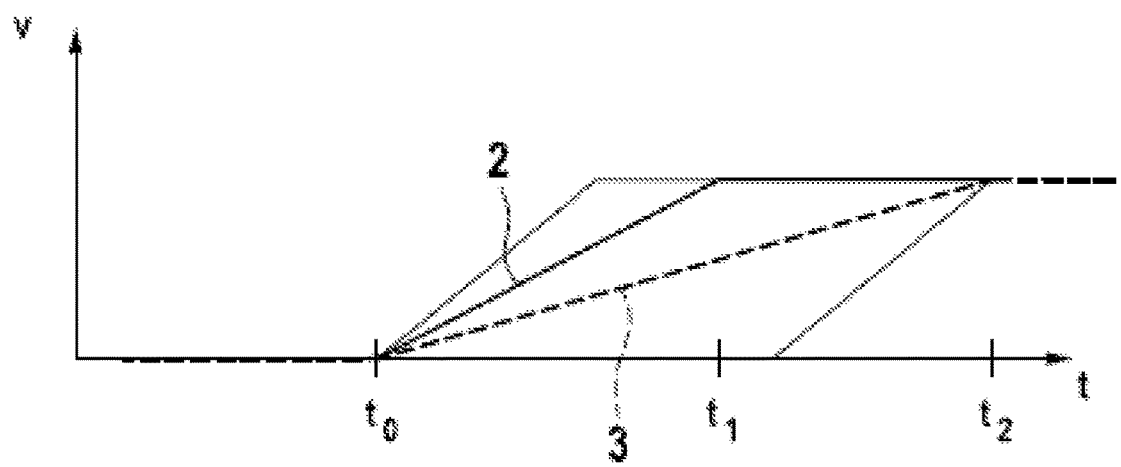
FIG. 2 a diagram in which a speed of a motor vehicle is plotted against time for the positive acceleration of the motor vehicle up ahead.

FIG. 2 shows a diagram in which the speed v of a motor vehicle is plotted against time t. The motor vehicle has a drive device for providing a driving torque as well as a detection device for detecting the at least one other motor vehicle up ahead. An automatic length guidance is carried out for the motor vehicle, during which a distance of the motor vehicle from the other motor vehicle is adjusted to a nominal distance.

The nominal distance corresponds to a distance setting at constant distance between the motor vehicles. If the distance between the motor vehicles changes on account of an acceleration of the other motor vehicle, the nominal distance will change, starting from the distance setting. In the case of a positive acceleration of the other motor vehicle, the nominal distance should be increased, and in the case of a negative acceleration of the other motor vehicle, it should be decreased.

The diagram shows a curve of the speed of the motor vehicle for a conventional distance regulation. It becomes clear that the acceleration of the motor vehicle corresponds substantially to the acceleration of the other motor vehicle. For this reason, the speed increases starting from time $t_0$ and reaches the final speed—for curve 2—at time $t_1$.

However, it is now provided, according to the procedure described above, to increase the nominal distance in the case of the positive acceleration starting from the distance setting. Accordingly, therefore, an increasing of the distance between the motor vehicles will be allowed, so that, on the whole, less acceleration needs to be provided. This is indicated by curve 3 of the speed of the motor vehicle plotted against time t. The final speed of the motor vehicle will be reached here only at time $t_2$.

Figure 3:
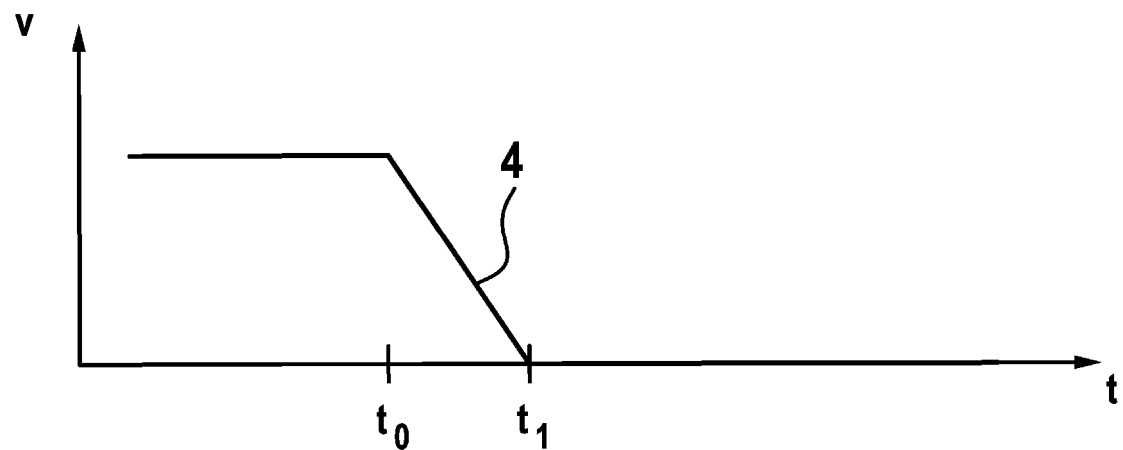
FIG. 3 a diagram in which the speed of the other motor vehicle is plotted against time for a negative acceleration.

FIG. 3 shows a curve 4 of the speed V of the other motor vehicle up ahead plotted against time t, where a negative acceleration is present. Accordingly, the other motor vehicle has a particular speed, which decreases starting from time $t_0$, namely, down to zero at time $t_1$.

Figure 4:
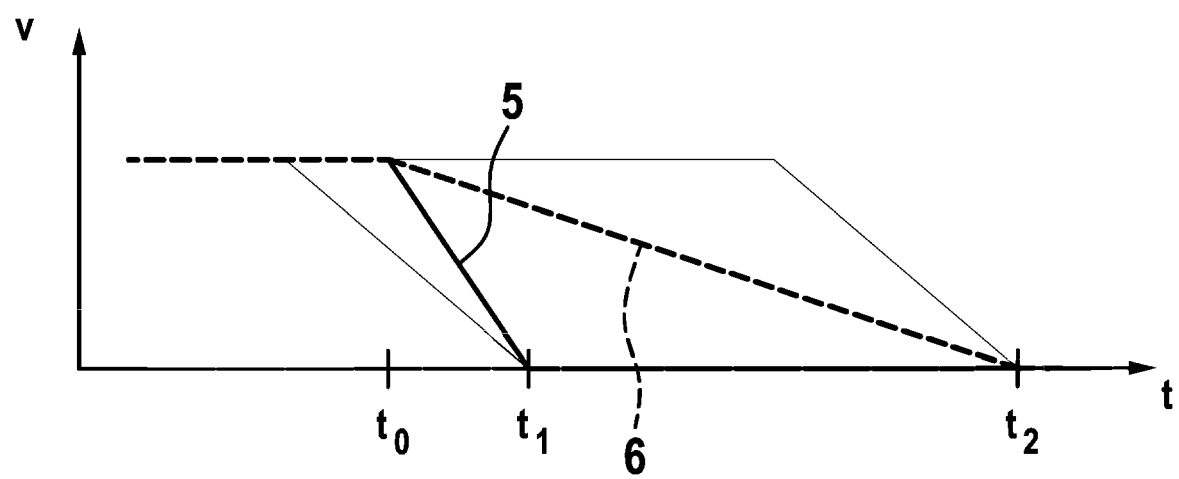
FIG. 4 a diagram in which the speed of the motor vehicle is plotted against time for the negative acceleration.

FIG. 4 shows a diagram in which a curve 5 and a curve 6 are represented, each of them for the speed V of the motor vehicle, plotted against time t. Once again, the curve 5 shows the speed of the motor vehicle for a conventional distance regulation, while curve 6 shows the described procedure.

For both curves 5 and 6, the speed decreases starting from time $t_0$ in the direction of a standstill of the motor vehicle. For curve 5, this is achieved at time $t_1$. Since, for the procedure illustrated on the basis of curve 6, a decreasing of the nominal distance is allowed, starting from the distance setting, less negative acceleration can be selected than for curve 5. Accordingly, here also, the motor vehicle attains standstill only later than the time for curve 5, namely, at time $t_2$.

The procedure described on the basis of the diagrams makes possible, on the one hand, a high degree of comfort for the motor vehicle, because sudden accelerations are avoided. On the other hand, the change in the speed with less acceleration is more energy-efficient. This is especially true when the motor vehicle is a hybrid operated motor vehicle and the torque used for the accelerating is provided solely by means of an electrical machine, while an internal combustion engine of the motor vehicle remains deactivated.

The invention claimed is:

1. A method for operating a first motor vehicle, comprising:
    carrying out an automatic length guidance of the first motor vehicle,
    wherein the first motor vehicle comprises a first drive assembly and a second drive assembly which each provide a driving torque to the first motor vehicle,
    the second drive assembly having a rated torque lower than that of the first drive assembly,
    as well as a detection device for detecting at least one second motor vehicle in front of the first motor vehicle,
    wherein in carrying out the automatic length guidance, a distance of the first motor vehicle from the at least one second motor vehicle is adjusted to a nominal distance, wherein the nominal distance initially corresponds to an initial distance between the first motor vehicle and the at least one second motor vehicle, the nominal distance is increased in the event of a distance change resulting from a positive acceleration of the at least one second motor vehicle, and the nominal distance is reduced in the event of a distance change resulting from a negative acceleration of the at least one second motor vehicle, wherein the nominal distance is bounded inclusively by a minimum distance and a maximum distance, which together span a distance setting range,
    wherein a predicted distance of the first motor vehicle from the at least one second motor vehicle at the end of accelerations of both the first motor vehicle and the at least one second motor vehicle is determined based on at least:
    a predicted acceleration of the first motor vehicle in response to a nominal torque; and
    the positive or the negative acceleration of the at least one second motor vehicle,
    wherein the nominal torque is set so that the predicted distance lies in the distance setting range,
    wherein the nominal torque is provided solely by the second drive assembly during a positive acceleration of the first motor vehicle, and
    wherein a configuration, in which the nominal torque is provided solely by at least one of a rolling friction torque and a drivetrain friction torque, is prioritized over a braking torque applied by a service brake of the first motor vehicle during a negative acceleration of the first motor vehicle.

2. The method as claimed in claim 1, wherein an acceleration setting is determined as a function of the positive or the negative acceleration of the at least one second motor vehicle and is set at the drive device,
wherein the acceleration setting is oriented to a speed change in the first motor vehicle and has a same sign as the acceleration of the at least one second motor vehicle.

3. The method as claimed in claim 1, wherein a final speed of the at least one second motor vehicle at an end of the positive acceleration is predicted based on at least one surrounding condition, and
wherein the final speed of the at least one second motor vehicle at an end of the negative acceleration is predicted based on the at least one surrounding condition.

4. The method as claimed in claim 1, wherein the nominal torque is chosen in such a way that the predicted distance of the first motor vehicle from the at least one second motor vehicle corresponds to either the minimum distance in a case of negative acceleration or the maximum distance in a case of positive acceleration.

5. The method as claimed in claim 1, wherein, starting from an end of the positive or the negative acceleration of the at least one second motor vehicle, the speed of the first motor vehicle is set by maintaining the nominal torque such that the distance between the first motor vehicle and the at least one second motor vehicle is changed to approach the nominal distance.

6. The method as claimed in claim 1, wherein the distance of the first motor vehicle from the at least one second motor vehicle is adjusted to the nominal distance when a speed of the at least one second motor vehicle remains constant starting from the end of the positive or the negative acceleration of the at least one second motor vehicle.

7. A first motor vehicle comprising:
a first drive assembly and a second drive assembly which each provide a driving torque to the first motor vehicle, the second drive assembly having a rated torque lower than that of the first drive assembly;
a detection device for detecting at least one second motor vehicle in front of the first motor vehicle; and
a device for carrying out an automatic length guidance of the first motor vehicle,
wherein the first motor vehicle is designed for the purpose of adjusting a distance of the first motor vehicle from the at least one second motor vehicle to a nominal distance in carrying out the automatic length guidance,
wherein, during the automatic length guidance of the first motor vehicle, the nominal distance initially corresponds to an initial distance between the first motor vehicle and the at least one second motor vehicle, the nominal distance is increased in the event of a distance change resulting from a positive acceleration of the at least one second motor vehicle, and the nominal distance is reduced in the event of a distance change resulting from a negative acceleration of the at least one second motor vehicle,
wherein the nominal distance is bounded inclusively by a minimum distance and a maximum distance, which together span a distance setting range,
wherein a predicted distance of the first motor vehicle from the at least one second motor vehicle at the end of accelerations of both the first motor vehicle and the at least one second motor vehicle is determined based on at least:
a predicted acceleration of the first motor vehicle in response to a nominal torque; and
the positive or the negative acceleration of the at least one second motor vehicle,
wherein the nominal torque is set so that the predicted distance lies in the distance setting range,
wherein the nominal torque is provided solely by the second drive assembly during a positive acceleration of the first motor vehicle, and
wherein a configuration, in which the nominal torque is provided solely by at least one of a rolling friction torque and a drivetrain friction torque, is prioritized over a braking torque applied by a service brake of the first motor vehicle during a negative acceleration of the first motor vehicle.

8. The method as claimed in claim 1, wherein, once set, the nominal torque is kept constant as long as the predicted distance stays in the distance setting range.

9. The method as claimed in claim 1, wherein the minimum distance is increaseable, but not decreaseable, by a user of the first motor vehicle, and
wherein the maximum distance is modifiable by the user at will.

10. The method as claimed in claim 3, wherein the surrounding condition comprises at least a traffic density.

11. The first motor vehicle as claimed in claim 7, wherein, once set, the nominal torque is kept constant as long as the predicted distance stays in the distance setting range.

12. The first motor vehicle as claimed in claim 7, wherein the minimum distance is increaseable, but not decreaseable, by a user of the first motor vehicle, and
wherein the maximum distance is modifiable by the user at will.

13. The first motor vehicle as claimed in claim 7, wherein a final speed of the at least one second motor vehicle at an end of the positive acceleration is predicted based on at least one surrounding condition, and
wherein the final speed of the at least one second motor vehicle at an end of the negative acceleration is predicted based on the at least one surrounding condition.

14. The first motor vehicle as claimed in claim 7, wherein the surrounding condition comprises at least a traffic density.

* * * * *